United States Patent
Balachandran et al.

(10) Patent No.: US 7,587,190 B2
(45) Date of Patent: Sep. 8, 2009

(54) SYSTEMS AND METHODS FOR LOW POWER CLOCK GENERATION

(75) Inventors: Ganesh K. Balachandran, Irving, TX (US); Raymond E. Barnett, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 396 days.

(21) Appl. No.: 11/430,391

(22) Filed: May 8, 2006

(65) Prior Publication Data

US 2007/0273485 A1 Nov. 29, 2007

(51) Int. Cl.
*H04B 1/06* (2006.01)
*H04B 7/00* (2006.01)

(52) U.S. Cl. ............ 455/260; 455/255; 340/572.1

(58) Field of Classification Search ........... 455/334; 340/572.1–572.9, 10.34, 10.33; 375/316, 375/345; 323/224, 228, 282
See application file for complete search history.

(56) References Cited

U.S. PATENT DOCUMENTS

| | | | |
|---|---|---|---|
| 6,052,010 A * | 4/2000 | Moyal | 327/254 |
| 6,614,842 B1 | 9/2003 | Chou et al. | |
| 2005/0078783 A1 | 4/2005 | Okita | |
| 2006/0018416 A1 | 1/2006 | Adkisson et al. | |
| 2007/0273417 A1* | 11/2007 | Lin | 327/158 |

\* cited by examiner

*Primary Examiner*—Thanh C. Le
*Assistant Examiner*—Christian A Hannon
(74) *Attorney, Agent, or Firm*—William B. Kempler; Wade J. Brady, III; Frederick J. Telecky, Jr.

(57) ABSTRACT

Various systems and methods for low power identification are described herein. For example, a radio frequency device including a radio frequency energy receiver. The radio frequency energy receiver is operable to receive a radio frequency energy and to convert the radio frequency energy to a DC current. In addition, the device further includes a first clock generator that generates a first clock at a first frequency and second clock generator that generates another clock based on the first clock. The first clock generator includes a duty cycle correction circuit. The second clock has a positive going clock edge for each edge of the first clock.

9 Claims, 3 Drawing Sheets

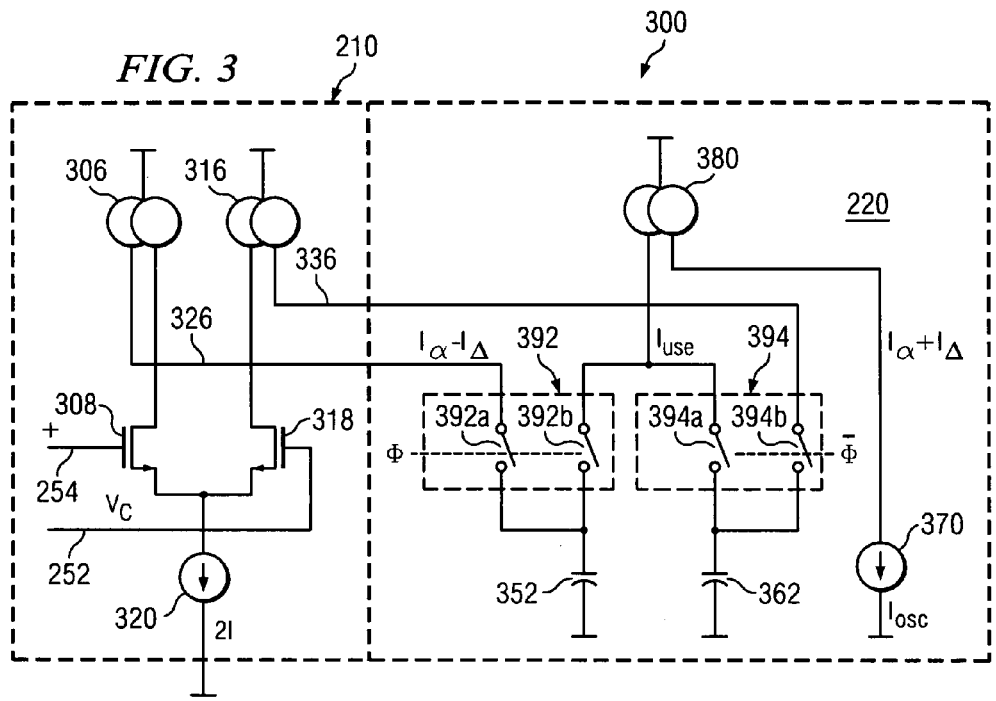
FIG. 3
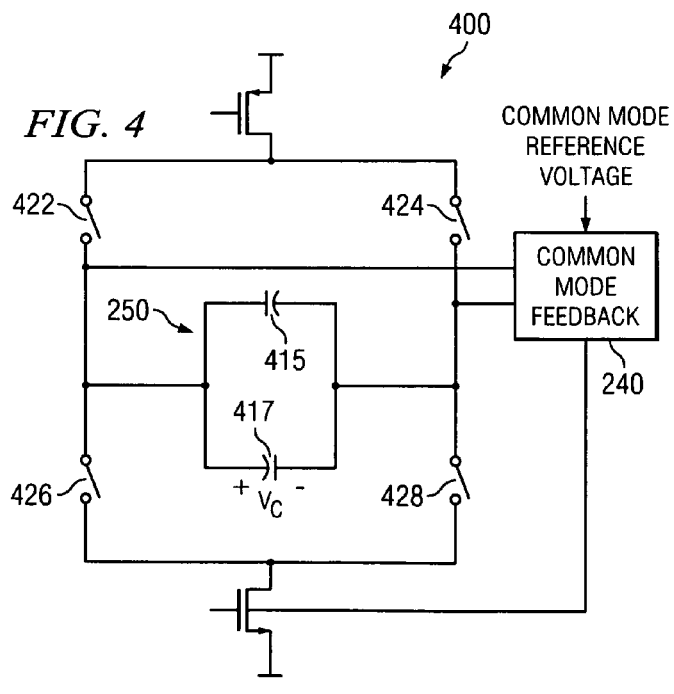
FIG. 4
FIG. 6

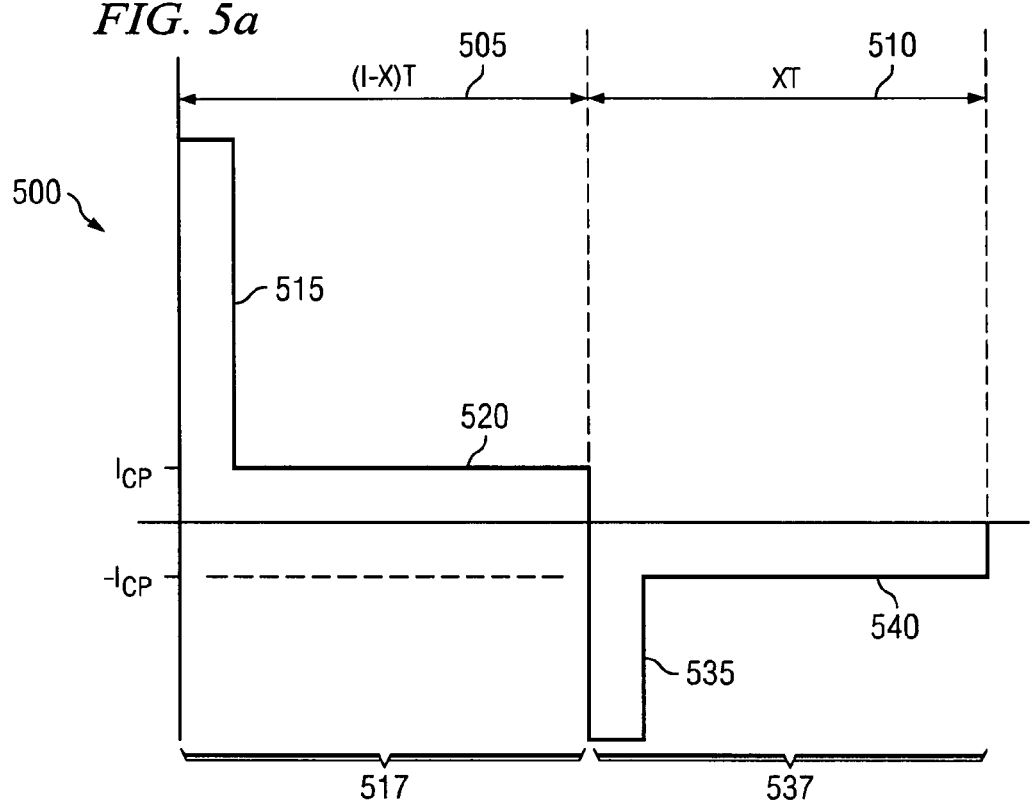
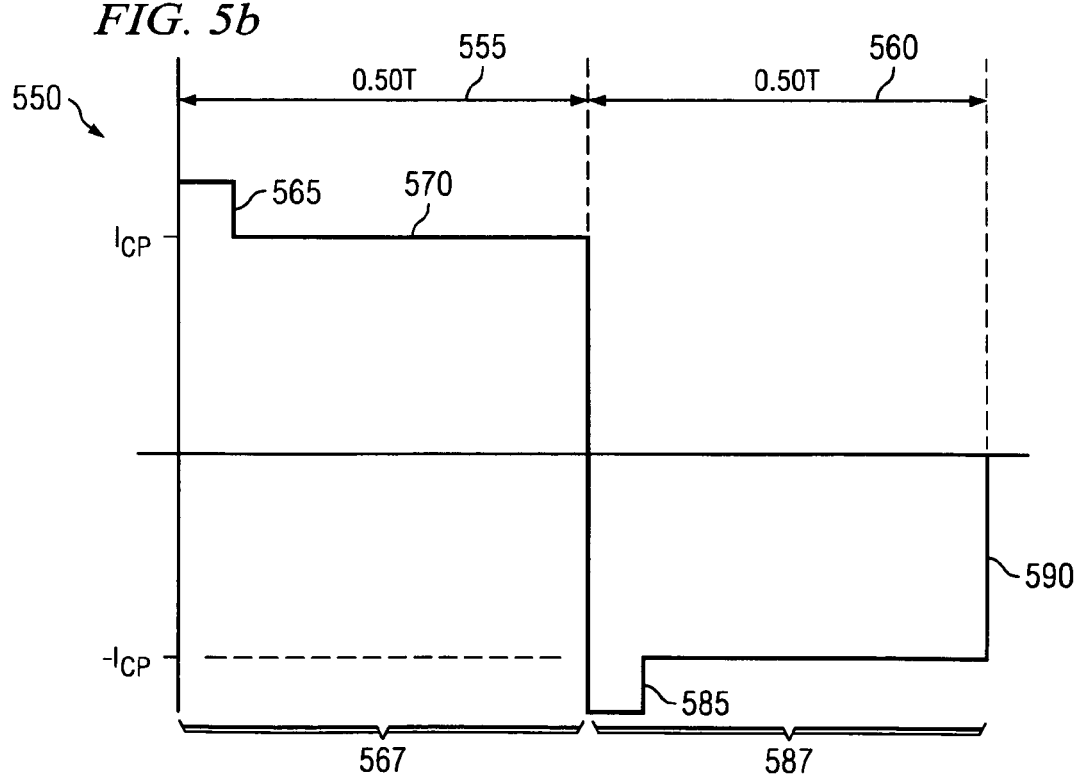

SYSTEMS AND METHODS FOR LOW POWER CLOCK GENERATION

BACKGROUND OF THE INVENTION

The present invention is generally related to systems and methods for improving clock accuracy, and more particularly to systems and methods for increasing clock accuracy in a low power environment.

Various devices exists that are remotely powered by radio frequency energy received from a transmitting device. As one example, radio frequency identification tags exist that are capable of accessing power transmitted via a radio frequency signal. In such an application, the equivalent Thevenin voltage received at the radio frequency identification tag may vary between one half Volt at a substantial distance from the transmitting device, and forty Volts when the transmitting device is very near the identification tag. To compensate for this substantial voltage difference, excess voltage may be dissipated through a circuit as simple as a resistor. Further, the voltage range over which such a tag is capable of operating may be increased by lowering the power requirement of the system through reducing the clock rate of the identification tag. Such an approach, however, may also reduce the accuracy and thus effectiveness of the identification tag.

Hence, for at least the aforementioned reasons, there exists a need in the art for advanced systems and methods for increasing clock accuracy in a low power environment.

BRIEF SUMMARY OF THE INVENTION

The present invention is generally related to systems and methods for improving clock accuracy, and more particularly to systems and methods for increasing clock accuracy in a low power environment.

Some embodiments of the present invention provide radio frequency devices that include a radio frequency energy receiver. The radio frequency energy receiver is operable to receive a radio frequency energy and to convert the radio frequency energy to a DC current. In addition, the devices further include a first clock generator that generates a first clock at a first frequency and second clock generator that generates another clock based on the first clock. The first clock generator includes a duty cycle correction circuit. The second clock has a positive going clock edge for each edge of the first clock.

In some cases of the aforementioned embodiments, the first clock generator includes an oscillator that is implemented in a current steering topology. Further, in some cases of the aforementioned embodiments, the duty cycle correction circuit includes a charge pump that receives a differential clock from the oscillator and provides a differential charge output; a capacitor with one plate electrically coupled to a positive end of the differential charge output and another plate of the capacitor is electrically coupled to the negative end of the differential charge output; and a current generating circuit that receives the differential charge output and provides a positive delta current and a negative delta current to the oscillator. In some particular cases, the charge pump provides an asymmetric charge injection at an output of the charge pump. In other particular cases of the aforementioned embodiments, the current generating circuit includes a differential input stage that is electrically coupled to a pair of current mirrors. In one or more cases of the aforementioned embodiments, the capacitor is implemented as two reversed capacitors in parallel.

In some cases of the aforementioned embodiments, the devices further include a dynamic bias circuit providing a variable current to the charge pump. This variable current may be used to reduce any asymmetry of the charge injection at the output of the charge pump. In particular cases of the aforementioned embodiments, the corrected duty cycle of the first clock is greater than forty-four percent when the device is in proximity of a power source is at least −3 dBm. In other cases, the corrected duty cycle of the first clock is greater than forty-nine percent when the device is in proximity of a power source is at least 19 dBm.

Other embodiments of the present invention provide methods for radio frequency identification. Such methods include providing a radio frequency identification device that includes: a radio frequency energy receiver that is operable to receive a radio frequency energy and to convert the radio frequency energy to a DC current; a first clock generator that generates a first clock at a first frequency, and includes a duty cycle correction circuit; and a second clock generator that generates a second clock that has a positive going clock edge for each edge of the first clock.

In some cases of the aforementioned embodiments, the methods further include providing a providing a dynamic bias circuit that provides a variable charge to the charge pump. In such cases, the variable charge may be used to reduce any asymmetry of the charge injection at the output of the charge pump. In some cases of the aforementioned embodiments, the methods further include receiving the radio frequency energy, and applying the variable charge to the duty cycle correction circuit. In such cases, an error source in the duty cycle correction circuit is reduced.

Yet other embodiments of the present invention provide low power frequency doubler circuits. Such low power frequency doubler circuits include a first clock generator that generates a first clock at a first frequency based on the radio frequency energy, and has a duty cycle correction circuit. Further, such low power frequency doubler circuits include a second clock generator that generates a second clock with a positive going clock edge for each edge of the first clock. In some cases, the first clock generator includes an oscillator that is implemented in a current steering topology. In particular cases, the duty cycle correction circuit includes a charge pump that receives a differential clock from the oscillator and provides a differential charge output; a capacitor with one plate of the capacitor electrically coupled to a positive end of the differential charge output and another plate of the capacitor is electrically coupled to the negative end of the differential charge output; and a current generating circuit, wherein the current generating circuit receives the differential charge output and provides a positive delta current and a negative delta current to the oscillator. In one or more cases of the aforementioned embodiments, the current generating circuit includes a differential input stage that is electrically coupled to a pair of current mirrors. In some cases of the aforementioned embodiments, the second clock generator creates a pulse corresponding to each edge of the first clock.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 3 is a schematic diagram of the current generating block and oscillator block of FIG. 2;

FIG. 4 is a schematic diagram of the charge pump block of FIG. 2;

FIGS. 5a-5b are exemplary diagrams showing the effect on error sources of injecting additional current in accordance with one or more embodiments of the present invention; and FIG. 6 depicts a current degradation circuit that may be used in accordance with one or more embodiments of the present invention.

DETAILED DESCRIPTION OF THE INVENTION

The present invention is generally related to systems and methods for improving clock accuracy, and more particularly to systems and methods for increasing clock accuracy in a low power environment.

Some embodiments of the present invention provide radio frequency devices that include a radio frequency energy receiver. The radio frequency energy receiver is operable to receive a radio frequency energy and to convert the radio frequency energy to a DC current. In addition, the devices further include a first clock generator that generates a first clock at a first frequency and second clock generator that generates another clock based on the first clock. The first clock generator includes a duty cycle correction circuit. The second clock has a positive going clock edge for each edge of the first clock. As used herein, the term "clock" is used in its broadest sense to mean any signal whether it be electrical, optical or otherwise that exhibits a particular frequency or range of frequencies. Thus, as just one of many examples, a clock may be a synchronizing signal used on a semiconductor device to control operation of one or more electrical circuits. Such a clock may be specified as, for example, a ten megahertz signal plus of minus ten percent. Based on the disclosure provided herein, one of ordinary skill in the art will recognize a myriad of clocks that may be used in accordance with embodiments of the present invention. Further, as used herein the phrase "duty cycle" is used in its broadest sense to mean the ration of half periods of a given clock and is discussed herein as a percentage less than or equal to fifty percent representing the smallest of the half periods. Thus, using such terminology, a clock with a forty percent duty cycle has one half period that is forty percent of the overall clock period and another period that is sixty percent of the overall clock period.

As used herein, the phrase "electrically coupled" is used in its broadest sense to mean any coupling whereby a signal from one element or a derivative thereof may be received as an electrical signal by another element. Thus as just one example, two elements may be electrically coupled where an electrically conductive wire connects the elements. As another example, two elements may be electrically coupled where one element provides an optical signal to an optical coupler that transforms the signal from the optical domain to the electrical domain and provides the electrical output to the other element. As yet another example, two elements may be considered electrically coupled where a signal from one element is provided to a filter which conditions the signal and passes the conditioned signal to the other element. There are, of course, many other examples of electrical coupling that comport with the aforementioned definition, and that may be used in relation to embodiments of the present invention.

Figure 1:
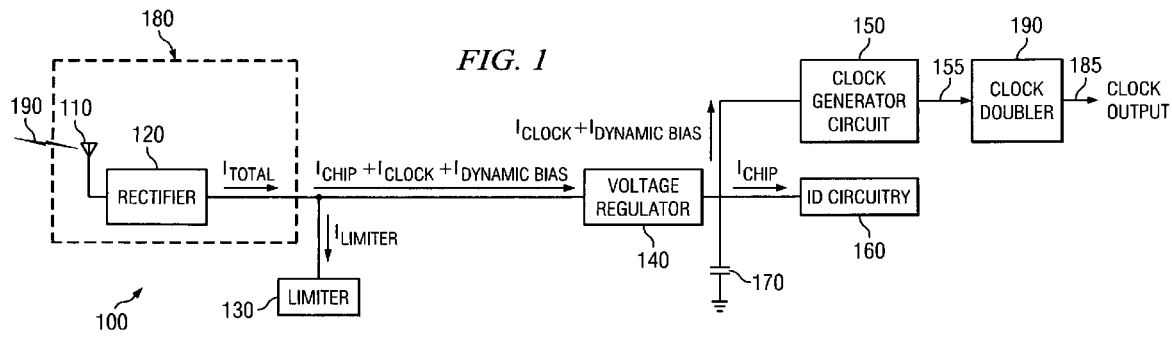
FIG. 1 is a block diagram of a radio frequency identification tag in accordance with one or more embodiments of the present invention.

Turning to FIG. 1, one embodiment of a radio frequency identification tag 100 is depicted. Radio frequency identification tag 100 includes a radio frequency energy receiver 180 capable of receiving radio frequency energy 190. In this particular embodiment, radio frequency energy receiver 180 is known in the art and includes an antenna 110 and a rectifier 120. In general, antenna 110 receives radio frequency energy 190 that is provided to rectifier 120, and rectifier 120 in turn provides an output DC voltage and associated current, $I_{Total}$. Such an energy receiver allows radio frequency identification tag 100 to operate without a battery or on reduced battery power. The Thevenin equivalent voltage from rectifier 120 is approximately:

$$V_{rect,out} = N(V_{RF,peak} - V_C),$$

where $V_{rect,out}$ is the output DC Thevenin voltage of rectifier 120, N is the number of stages in the rectifier which in one particular embodiment of the present invention is eight, $V_{RF,peak}$ is the peak radio frequency voltage detected by radio frequency identification tag 100, and $V_c$ is a constant associated with a particular rectifier topology. In one particular embodiment of the present invention, the topology of rectifier 120 is Schottky based and $V_c$ is the Schottky forward turn on voltage of 0.21V. Based on the preceding equation, rectifier 120 operates in a weak condition at a minimum sensitivity (e.g., VRF, peak=0.25V) but gains strength even at slightly elevated signal levels for such an embodiment. Thus, for example, as the peak radio frequency energy received by antenna 110 increases from 0.25V to 1.8V, $I_{Total}$ varies from two microamps to three milliamps. Of this current, only a small portion (e.g., a few microamps) is utilized as $I_{Clock}$ and $I_{Chip}$, and the majority is bypassed through a limiter 130 as $I_{Limiter}$. A portion of $I_{Total}$ (i.e., $I_{Dynamic\ Bias}$) that would otherwise be bypassed through limiter 130 is provided to various circuitry of radio frequency identification tag 100 to provide what is referred to herein as a "dynamic boost" or "dynamic boosting".

In a typical operation, radio frequency energy 190 is provided to radio frequency identification tag 100 in bursts of differing durations. As an example, a relatively long burst of energy followed by a relatively short period of no energy may represent a logic '1', whereas a relatively short burst of energy followed by a relatively long period of no energy may represent a logic '0'. Based on the disclosure provided herein, one of ordinary skill in the art will recognize other designs for radio frequency energy reception that may be used in relation to one or more embodiments of the present invention. For example, such designs may include a succession of rectifiers, voltage multipliers and clamps that are capable of providing a desired DC voltage to power a given chip.

$I_{Total}$ includes four constituent components: $I_{Chip}$, $I_{Clock}$, $I_{Dynamic\ Bias}$, and $I_{Limiter}$. $I_{Limiter}$ includes all excess current that is dissipated through a limiter circuit 130 and not used by various other circuitry of radio frequency identification tag 100. Limiter circuit 130 may include a series of transistor gated paths each operable to drop a different amount of current depending upon the voltage available from rectifier 120. One exemplary limiter circuit is disclosed in U.S. patent application Ser. No. 11/213,063 entitled "Voltage Regulator Circuits for RFID Systems", and filed Aug. 26, 2005. The entirety of the aforementioned patent application is assigned to an entity common hereto and incorporated herein by reference for all purposes. Based on the disclosure provided herein, one of ordinary skill in the art will recognize other limiter circuits that may be used in relation to one or more embodiments of the present invention.

$I_{Chip}$, $I_{Clock}$, and $I_{Dynamic\ Bias}$ are provided to a voltage regulator circuit 140 that is operable to stabilize the voltage provided to other circuitry of radio frequency identification tag 100. IChip is the nominal amount of current that is required to operate ID circuitry 160, and IClock is the nominal amount of current that is required to operate clock generator circuit 150. IDynamic Bias is current that would have otherwise been dropped via limiter 130, but that is applied in proportion to ID circuitry 160 and clock generator circuit 150 to provide more predictable operation as more fully discussed below in relation to FIGS. 5a-5b. ID circuitry 160 may be any circuitry designed to implement the functions of radio frequency identification tag 100. Thus, ID circuitry 160 may include combinatorial logic blocks, register devices and/or the like assembled into any desired design. In particular embodiments of the present invention, the circuitry included in ID circuitry 160 is limited to reduce the amount of $I_{Chip}$ current required to operate the circuitry. The combination of $I_{Chip}$, $I_{Clock}$, and $I_{Dynamic\ Bias}$ additionally charges a capacitor 170. In particular, capacitor 170 is charged when radio frequency energy 190 is available, and in the absence of radio frequency energy 190 provides a reservoir of charge from which identification circuitry 160 and clock generator may draw.

Using $I_{Clock}$, clock generator circuit 150 generates a clock 155. In some embodiments of the present invention, clock generator circuit 150 includes an oscillator implemented in a current steering topology. Based on clock 155, clock doubler 190 generates an output clock 185 that has a positive going clock edge for each positive and negative edge of clock 155. Based on the disclosure provided herein, one of ordinary skill in the art will recognize a variety of circuits that may be used to perform the function of clock doubler 190. One such circuit may be distributed throughout ID circuitry 160 where all flip fops are clocked on either a positive or a negative edge of clock 155. Alternatively, clock 185 may be created by generating a pulse of a particular period each time either a positive edge or negative edge of clock 155 occurs. Such a circuit may be implemented using two one shots with the output of the one shots ORed together. Based on the disclosure provided herein, one of ordinary skill in the art will recognize many other possible circuit designs. Output clock 185 is used to synchronize ID circuitry 160 and thus govern operation of radio frequency identification tag 100.

By doubling the clock, greater sampling precision may be implemented in ID circuitry 160. However, in such embodiments, the duty cycle of the clock provided by the oscillator may be substantially less than fifty percent. When doubled, the aforementioned duty cycle error results in a variance in the period of the doubled clock. The aforementioned period variance constrains any precision achievable in ID circuitry 160, and thus some embodiments of the present invention may implement duty cycle correction to increase the available precision. By applying such duty cycle correction, the variance of the period of the doubled clock may be significantly reduced resulting in a higher effective clock frequency using lower power than what would have been required to implement such a higher frequency using other methods such as, for example, a phase lock loop.

In one exemplary embodiment of the present invention, clock 155 generated by clock generator circuit 150 is 1.28 MHz is doubled by clock doubler 190 to be 2.56 MHz and provided as clock output clock 185. The choice of such frequencies is based on a tradeoff between current consumption and accuracy of transmit frequencies. The oscillator frequency is described by the following equation:

$$f_{osc} = \frac{I}{C_{ref}V_{ref}}.$$

For a given reference capacitance ($C_{ref}$) and reference voltage ($V_{ref}$), the oscillator current consumption scales with frequency. Thus, directly doubling the frequency results in an approximate doubling of the power required to generate clock 155. This can be very significant particularly where a radio frequency powered chip is operating near the bottom of its power range. In some cases, the power required to generate the doubled clock may be forty percent or more of the overall power available to operate the chip.

In contrast, one or more embodiments of the present invention generate a lower frequency clock which is then doubled by creating a positive going edge on each rising and falling edge of the lower frequency clock. Such an approach minimizes power requirements, yet provides a higher frequency clock that is capable of increasing sampling accuracy. In such cases, clock generator circuit 150 includes a duty cycle correction circuit that is operable to adjust the duty cycle of the generated clock such that the doubled clock has a reasonably stable period.

Figure 2:
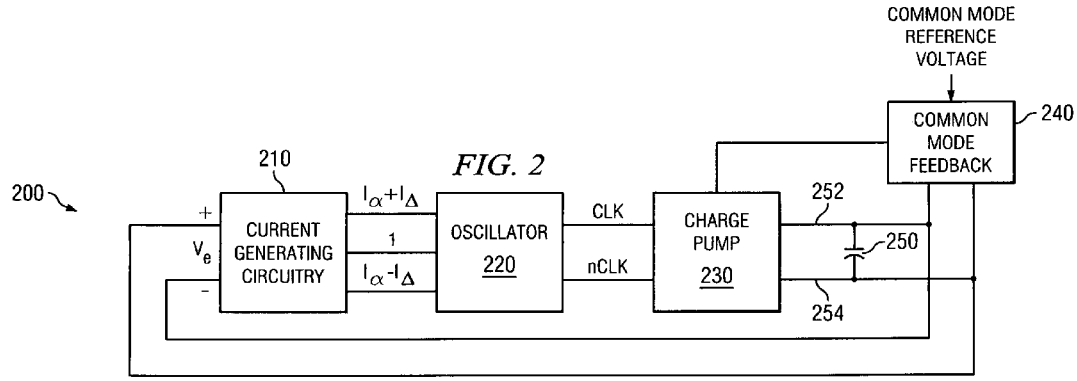
FIG. 2 is a block diagram of a clock generator with a duty cycle correction circuit in accordance with various embodiments of the present invention.

Turning to FIG. 2, a block diagram of a clock generator 200 with duty cycle correction circuitry in accordance with various embodiments of the present invention is depicted. In some cases, clock generator 200 may be used in place of clock generator 150 of FIG. 1. Clock generator 200 includes current generating circuitry 210, an oscillator 220, a charge pump 230, a common mode feedback 240, and an error detection capacitor 250. Oscillator 220 provides a differential clock output labeled CLK and nCLK. In operation, charge pump 250 drives two feedback outputs 252, 254 that are electrically coupled to respective plates of capacitor 250. Thus, feedback outputs 252, 254 are constantly charging and discharging capacitor 250. Feedback output 252 is derived from CLK and feedback output 254 is derived from nCLK. Thus, when feedback output 252 is asserted high, feedback output 254 is asserted low and vice versa. However, where the duty cycle of the clock provided by oscillator 220 is not fifty percent, a residual charge will remain on capacitor 250 as the charge and discharge times are not identical. The charge that remains on capacitor 250 provides an error feedback to current generating circuitry 210.

Based on the error feedback from capacitor 250, current generating circuitry 210 generates two half currents (Iα+IΔ and Iα−IΔ) that are provided to oscillator 220. The duty cycle of the differential clock (i.e., CLK and nCLK) is driven by the two half currents such that the error voltage on capacitor 250 is driven to zero when the duty cycle is approximately fifty percent.

Turning to FIG. 3, a schematic diagram 300 of an exemplary current generating block 210 and oscillator block 220 in accordance with one or more embodiments of the present invention is depicted. As shown, exemplary current generating block 210 is implemented with two current mirrors 306, 316 each electrically coupled to the drain of a respective transistor 308, 318. The sources of transistors 308, 318 are each attached to a current source 320, and the gates of transistors 308, 318 are electrically coupled to one of feedback outputs 252, 254. Transistors 308, 318 operate together to steer current (2*$I_\alpha$) pulled by current source 320 depending upon the relative assertion of feedback outputs 252, 254. Thus, for example, when feedback output 252 is equal to feedback output 254, each of transistors 308, 318 conduct the same amount of current ($I_\alpha$). In this condition, current mirrors 306, 316 provide respective output currents 326, 336 to oscillator 220 that are approximately equivalent to each other.

Alternatively, when feedback output 254 is greater than feedback output 252, a greater percentage of the current is directed through transistor 308 ($I_\alpha+I_\Delta$), and a lesser percentage of the current is directed through transistor 318 ($I_\alpha-I_\Delta$). In this case, output current 326 will also be greater than output current 336. Similarly, when feedback output 254 is less than feedback output 252, a greater percentage of the current is directed through transistor 318 ($I_\alpha+I_\Delta$), and a lesser percentage of the current is directed through transistor 308 ($I_\alpha-I_\Delta$). In this case, output current 336 will be greater than output current 326.

In the depicted schematic, oscillator 220 is implemented using a current steering topology where charge is steered between two capacitors 352, 362. In particular, a current source 370 generates a current, $I_{OSC}$, that is reflected by a current mirror 380 and provided to a set of switches 392, 394 that operate to switch $I_{OSC}$ into respective ones of capacitors 352, 362. In addition, $I_{OSC}$ is augmented with either of $I_\alpha-I_\Delta$ or $I_\alpha-I_\Delta$ depending upon the differential voltage presented by feedback outputs 252, 254.

As will be appreciated by one of ordinary skill in the art, the duty cycle provided by oscillator 220 implemented using a current steering topology is degraded where, among other things, capacitors 352, 362 are not matched, or signal offsets are imprecise. The half currents $I\alpha-I\Delta$ or $I\alpha+I\Delta$ operate to counteract these sources of error by applying a differential current to capacitors 352, 362. In particular, capacitor 352 is electrically coupled repeatedly at a frequency Φ to output current 326, and capacitor 362 is electrically coupled repeatedly at the same frequency but at an opposite phase to output current 336.

Turning now to FIG. 4, a schematic diagram 400 of an exemplary charge pump 230 capacitor 250 and common mode feedback 240 in accordance with some embodiments of the present invention. As shown, capacitor 250 is formed of two capacitors electrically coupled with one inverted relative to the other. Exemplary charge pump 230 includes a set of switches 422, 424, 426, 428 that are arranged and operated such that current is provided to capacitors 415, 417 in one direction when CLK is asserted high, and another direction when nCLK is asserted high. This process of switching integrates the difference in the high and low time periods of the differential clock resulting in the voltage error signal, $V_e$, discussed above in relation to FIG. 2 as feedback outputs 252, 254.

Charge pump 230 acts like a duty-cycle to current converter with the following transfer function ($TF_{cp}$):

$$TF_{cp} = 2\frac{I_{cp}}{T_{clk}},$$

where $I_{cp}$ is the charge pump current and $T_{clk}$ is the oscillator period. Charge pump 230 has the same pump-up and pump-down currents and there is very little if any error due to mismatch in the pump up and pump down currents. Current generating circuitry 210 acts like a transconductor and steers a differential current into oscillator 220 based on the error signal at the charge pump output (i.e., the charge maintained on capacitor 250). The transfer function ($TF_{steer}$) of current generating circuitry 210 is its small signal transconductance (gm) as set forth in the following equation:

$$TF_{steer}=gm.$$

Assuming no non-idealities of oscillator 220, oscillator 220 behaves like a current to duty-cycle converter with an output duty cycle less than fifty percent if the currents steered into two capacitors different (i.e., the current steered into capacitors 352, 362 of FIG. 3 discussed below). The transfer function of oscillator 220 ($TF_{OSC}$) is given by the following equation:

$$TF_{osc} = \frac{-T_{clk}}{2I_{osc} + 2I_\alpha},$$

where $I_{OSC}$ represents the fixed oscillator current and $I_\alpha$ represents the portion that is steered into each capacitor if everything were ideal. Since charge pump 230 along with capacitor 250 act like an integrator with infinite DC gain, all the error sources following this stage are reduced to zero when referred to the input. The only error source that is not fully corrected is the asymmetric charge injection into capacitor 250 at the end of each half cycle due to closing of switches 422, 424, 426, 428. As this charge injection occurs before the aforementioned integration, the error due to charge injection is not fully suppressed. In particular, any asymmetric charge injection will result in a differential voltage that will increase over time. To reduce any error due to asymmetric charge injection, the feedback loop will correct itself by adjusting the duty cycle so that the total charge flowing into capacitor 250 during the pump up period will be eliminated during the pump down period of charge pump 230. This process is depicted in FIGS. 5a-5b which are discussed below.

Turning now to FIGS. 5a-5b, one process in accordance with some embodiments of the present invention for reducing error due to asymmetric charge injection is discussed. In particular, FIG. 5a shows such an asymmetric charge injection 500 where the steady state current provided by charge pump 230 ($I_{cp}$) is operating at a level only minimally able to provide sufficient $I_{Clock}$ and $I_{Chip}$. Two spikes 515, 535 representing the asymmetric charge injection at the end of each half cycle when switches 422, 424, 426, 428 turn off. In addition, two flat regions 520, 540 are show that represent the steady flow of current (i.e., steady state current $I_{cp}$) into capacitor 250. Under equilibrium, the positive and negative areas 517, 537 are equal, and a period 505 is different from a period 510. Said another way, the duty cycle is something less than fifty percent as defined by the following equation:

$$\frac{\Delta t}{T_{clk}} = \frac{\text{Area of Spike}}{4*\text{Total Area}}.$$

As shown by the aforementioned equation, this degradation in duty cycle is greater where the area under flat regions 520, 540 is a smaller percentage of the overall areas 517, 537.

As an example, asymmetric charge injection 500 may have spikes 515, 535 that include approximately half of the overall charge that is injected during any given half period (i.e., the area of spike 515 is approximately half of overall area 517, and the area of spike 535 is approximately half of overall area 537). Using the aforementioned equation, the duty cycle degradation is:

$$\frac{\Delta t}{T_{clk}} = \frac{1/2}{4} = 0.125.$$

Thus, in the aforementioned situation, the duty cycle is approximately 37.5 percent rather than the desired fifty percent.

To account for this error, some embodiments of the present invention provide a dynamic boost current (i.e., $I_{Dynamic\ Bias}$) to augment $I_{cp}$ as shown in asymmetric charge injection 550 of FIG. 5b. In this case, current that would have otherwise been dissipated via limiter 130 is diverted to clock generator circuit 150. As such, the value of $I_{cp}$ is increased as represented by flat lines 570, 590, and two spikes 565, 585 representing the asymmetric charge injection at the end of each half cycle when switches 422, 424, 426, 428 turn off become less significant in relation to overall positive and negative areas 567, 587. Again, under equilibrium, the positive and negative areas 567, 587 are equal, and a period 555 is more closely related to a period 560 than were the previously discussed periods 505, 510. Said another way, the duty cycle is closer to fifty percent where a dynamic boost is used to augment $I_{cp}$. Indeed, augmenting $I_{cp}$ with only a small dynamic boost can yield a dramatic improvement in duty cycle.

Where such a dynamic current boost is applied in a radio frequency identification tag, it can result in a nearly fifty percent duty cycle across a wide operational range of the tag. The following Table 1 depicts just some exemplary duty cycle improvements that may be achieved using one or more embodiments of the present invention and for different dynamic boost scenarios.

TABLE 1

| Exemplary Duty Cycle Measurements | |
|---|---|
| Duty cycle without loop correction (charge pump outputs shorted) | 37% |
| Duty cycle with loop activated at min RF (−3 dBm) | 46% |
| Duty cycle with loop activated at max RF (19 dBm) | 49.9% |

In one particular embodiment of the present invention, $I_{Dynamic\ Bias}$ may vary as high as five times $I_{Chip}$, but can be only a minimal addition to $I_{Clock}$ and yet have substantial influence on any duty cycle correction. For example, in some cases, the benefits due to dynamic boosting (i.e., applying $I_{Dynamic\ Bias}$) are evident where input radio frequency energy increases only a few millivolts.

Based on the aforementioned discussion, one of ordinary skill in the art will recognize that signals in duty cycle correction circuitry 200 exist both in time and voltage domains. In such a circuit, this is discrete-time in nature and there is an attenuated repetition of the loop gain transfer function at intervals of the clock frequency. For this reason, it may be desirable to limit the unity gain frequency of the loop to about ten percent the clock frequency under any circumstance. The following equation defines the unity gain frequency ($f_u$) of the loop:

$$f_u = \frac{I_{cp} * gm}{2\pi(I_{osc} + I_\alpha)C}.$$

Increasing the current provided by charge pump 230 (i.e., $I_{cp}$) results in a corresponding increase in $f_u$. For this reason, it may be desirable to limit any dynamic boost used to augment $I_{cp}$. In one particular embodiment of the present invention, a circuit operable to degenerate the current production of duty cycle correction circuitry 200 may be used. FIG. 6 shows a current degeneration circuit 600 that may be used in accordance with one or more embodiments of the present invention. Current degradation circuit 600 includes a resistor 610 and a transistor 620 with a gate (g), a drain (d) and a source (s). The gate of transistor 620 is electrically coupled to the gate of the MOS diode of the limiter disclosed in disclosed in U.S. patent application Ser. No. 11/213,063 filed Aug. 28, 2005 by Ganesh K. Balachandran et al. which was previously incorporated herein by reference for all purposes. The source of transistor 620 is electrically coupled to ground via resistor 610.

In conclusion, the present invention provides novel systems, methods and arrangements for clock generation. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A low power frequency doubler circuit, the circuit comprising:
   a first clock generator, wherein the first clock generator includes an oscillator, implemented in a current steering topology which generates a first clock at a first frequency, and wherein the first clock generator includes a duty cycle correction circuit comprising:
   a charge pump, which receives a differential clock from the oscillator, and wherein the charge pump provides a differential charge output;
   a capacitor, one plate of the capacitor being electrically coupled to a positive end of the differential charge output and another plate of the capacitor being electrically coupled to the negative end of the differential charge output;
   a current generating circuit, which includes a differential input stage, the differential input stage being electrically coupled to a pair of current mirrors and wherein the current generator circuit receives the differential charge output and provides a positive delta current and a negative delta current to the oscillator; and
   a second clock generator, wherein the second clock generator generates a second clock, and wherein the second clock has a positive going clock edge for each edge of the first clock.

2. The device of claim 1, wherein the second clock generator creates a pulse corresponding to each edge of the first clock.

3. The circuit of claim 1, wherein the charge pump provides an asymmetric charge injection at an output of the charge pump.

4. The circuit of claim 3, further comprising:
   a dynamic bias circuit, wherein the dynamic bias circuit provides a variable current to the charge pump, and wherein the variable current reduces the percentage of asymmetry of the charge injection at the output of the charge pump.

5. A low power frequency doubler circuit, the circuit comprising:
   a first clock generator, wherein the first clock generator includes;
   an oscillator implemented in a current steering topology for
   generating a first clock at a first frequency, and wherein the first clock generator includes a duty cycle correction circuit including a charge pump, wherein the charge pump receives a differential clock from the oscillator, and wherein the charge pump provides a differential charge output;
   a capacitor, wherein one plate of the capacitor is electrically coupled to a positive end of the differential charge output and another plate of the capacitor is electrically coupled to the negative end of the differential charge output;
   a current generating circuit including a differential input stage, and wherein the differential input stage is electrically coupled to a pair of current mirrors, wherein the current generating circuit receives the differential charge output and provides a positive delta current and a negative delta current to the oscillator;
   a second clock generator, wherein the second clock generator generates a second clock, and wherein the second clock creates a pulse corresponding to each edge of the first clock; and
   a radio frequency energy receiver, wherein the radio frequency energy receiver is operable to receive a radio frequency energy and to convert the radio frequency energy to a DC current.

6. The circuit of claim 5, wherein the charge pump provides an asymmetric charge injection at an output of the charge pump.

7. The circuit of claim 6, further comprising:
   a dynamic bias circuit, wherein the dynamic bias circuit provides a variable current to the charge pump, and wherein the variable current reduces the percentage of asymmetry of the charge injection at the output of the charge pump.

8. The circuit of claim 7, wherein the duty cycle of the first clock is greater than forty-four percent when the circuit is in proximity of a power source is at least negative 3 dBm.

9. The device of claim 7, wherein the duty cycle of the first clock is greater than forty-nine percent when the circuit is in proximity of a power source is at least 19 dBm.

* * * * *

UNITED STATES PATENT AND TRADEMARK OFFICE
CERTIFICATE OF CORRECTION

PATENT NO. : 7,587,190 B2
APPLICATION NO. : 11/430391
DATED : September 8, 2009
INVENTOR(S) : Balachandran et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 519 days.

Signed and Sealed this

Twenty-first Day of September, 2010

David J. Kappos
*Director of the United States Patent and Trademark Office*